United States Patent
Zuteck

(10) Patent No.: US 9,404,473 B2
(45) Date of Patent: Aug. 2, 2016

(54) STRAIN ISOLATED ATTACHMENT FOR ONE-PIECE WIND TURBINE ROTOR HUB

(71) Applicant: Michael Zuteck, Clear Lake Shores, TX (US)

(72) Inventor: Michael Zuteck, Clear Lake Shores, TX (US)

( * ) Notice: Subject to any disclaimer, the term of this patent is extended or adjusted under 35 U.S.C. 154(b) by 0 days.

(21) Appl. No.: 14/510,287

(22) Filed: Oct. 9, 2014

(65) Prior Publication Data

US 2016/0102652 A1    Apr. 14, 2016

(51) Int. Cl.
*F03D 1/06*    (2006.01)
*F03D 1/00*    (2006.01)

(52) U.S. Cl.
CPC .............. *F03D 1/0691* (2013.01); *F03D 1/001* (2013.01)

(58) Field of Classification Search
CPC ......... F03D 1/06; F03D 1/065; F03D 1/0658; F03D 1/0666; F03D 1/0691; F03D 1/0608; F03D 1/0625
USPC .......... 416/244 R, 248, 226, 239, 234, 223 R, 416/19
See application file for complete search history.

(56) References Cited

U.S. PATENT DOCUMENTS

| | | | | |
|---|---|---|---|---|
| 1,000,602 | A * | 8/1911 | Jacobs | 416/225 |
| 4,191,506 | A * | 3/1980 | Packham | B64C 11/00 416/232 |
| 4,350,898 | A * | 9/1982 | Benoit | 290/55 |
| 4,355,955 | A | 10/1982 | Kisovec | |
| 4,557,666 | A * | 12/1985 | Baskin et al. | 416/32 |
| 4,565,929 | A | 1/1986 | Baskin | |
| 5,213,470 | A | 5/1993 | Lundquist | |
| 5,354,175 | A | 10/1994 | Coleman | |
| 7,118,338 | B2 | 10/2006 | Moroz et al. | |
| 7,381,029 | B2 | 6/2008 | Moroz | |
| 2006/0104820 | A1 | 5/2006 | Delucis | |
| 2007/0154317 | A1 | 7/2007 | Cairo | |
| 2008/0012346 | A1 | 1/2008 | Bertolotti | |
| 2009/0016896 | A1 * | 1/2009 | Hill | F03D 1/0658 416/244 R |
| 2010/0135815 | A1 | 6/2010 | Bagepalli | |
| 2013/0115068 | A1 * | 5/2013 | Borgen et al. | 415/191 |
| 2013/0177444 | A1 * | 7/2013 | Bech | F03D 1/0691 416/244 R |
| 2013/0280089 | A1 | 10/2013 | Meesala | |

FOREIGN PATENT DOCUMENTS

GB    780381    7/1957

OTHER PUBLICATIONS

"Stories of a drawing Wind Power Industry" Winds Of Change [online]. Jul. 1, 2014. <https://web.archive.org/web/20140701122109/http://www.windsofchange.dk/WOC-usastat.php>.

* cited by examiner

*Primary Examiner* — Richard Edgar
*Assistant Examiner* — Brian O Peters
(74) *Attorney, Agent, or Firm* — David McEwing

(57) ABSTRACT

A wind turbine rotor hub attachment that extends inside a one-piece two-bladed wind turbine rotor hub, and secures to its shear web(s). This isolates the attachment from the high strains on the hub exterior, and allows balanced loads to flow across the hub, so that only unbalanced air loads and torque, plus net rotor loads such as thrust and weight, are passed across from the rotor to the wind turbine main shaft. This solves the excess motion problem of central teeter hinges, is mechanically simpler, and reduces overall weight and cost compared to the conventional practice of using individual blades bolted to a separate central hub. A method for connecting a one-piece two bladed wind turbine rotor to a main shaft using a strain isolating attachment to the rotor hub shear web(s) is included.

15 Claims, 8 Drawing Sheets

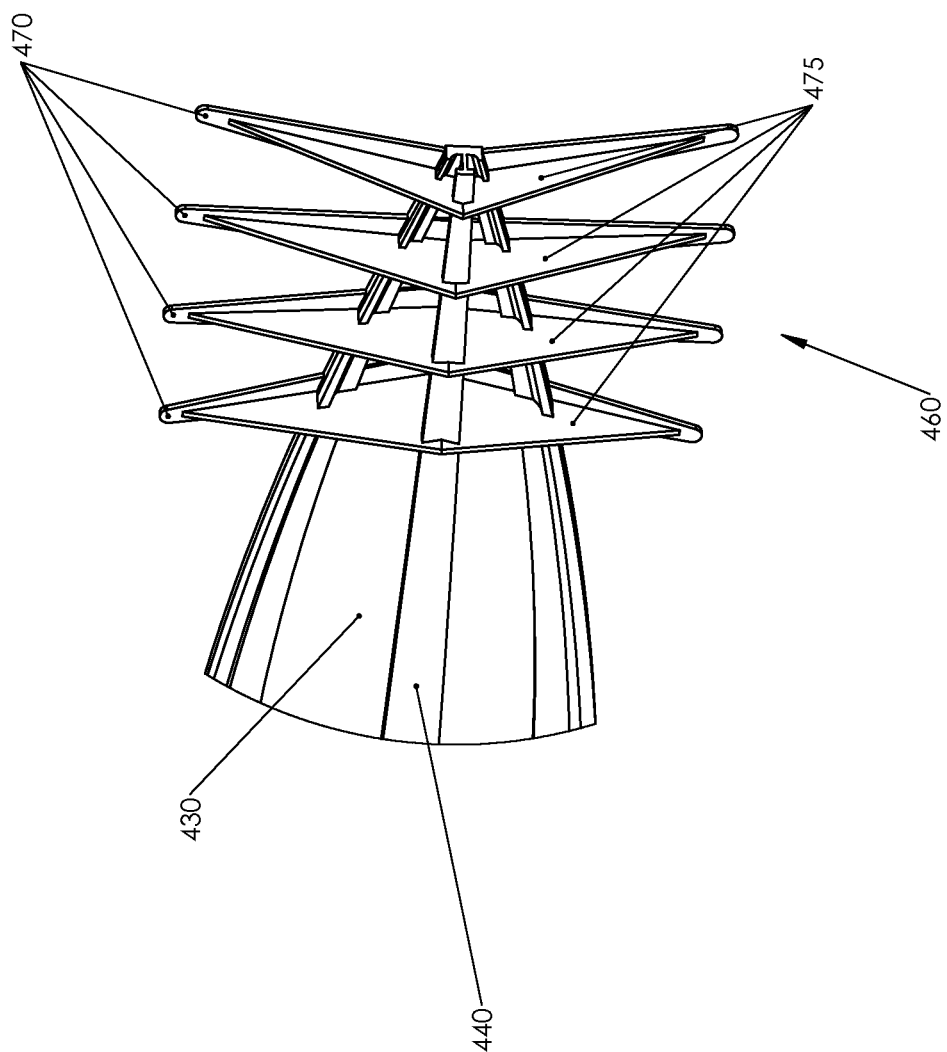

STRAIN ISOLATED ATTACHMENT FOR ONE-PIECE WIND TURBINE ROTOR HUB

BACKGROUND OF DISCLOSURE

1. Field of Use

This disclosure pertains to power generating wind turbines utilizing a two bladed rotor that has one-piece continuous structure through its mid-rotor hub region to unify one blade to the other. The rotor is rigidly connected to the wind turbine main shaft, rather than hinged (teetered). The attachment may be used with single, double, or multiple spar rotor hub structural configurations.

2. Prior Art

Two bladed designs for power generating wind turbines are known in the art. One piece rotors are also known in the art. A flap controlled one piece rotor was designed by General Electric in the 1980s. It used a center hinge to allow the rotor to teeter relative to the turbine main shaft for load relief. More recent rigid two-bladed rotors generally use full or partial span pitch.

BACKGROUND TO DISCLOSURE

The strain isolating one-piece rotor hub attachment (the structure that attaches the rotor hub to the wind turbine main shaft) seeks to substantially decrease wind turbine rotor and hub attachment weight by providing an efficient way to attach a one-piece rotor to a wind turbine main shaft, which shaft carries the rotor loads into the wind turbine. Most prior efforts to attach large one-piece rotors have used a central teeter hinge to reduce flap loads that are transferred into the turbine main shaft, but it was found that occasional large motions in certain wind events caused very large loads at the teeter limits that rendered the teeter hinge approach problematic in practice. A direct connection between the rotor hub and the turbine main shaft solves this problem.

A one-piece wind turbine rotor hub comprises continuous blade structure that extends from one blade to the other, thereby eliminating heavy and expensive pitch bearings, bolts, and separate hub components, but does not provide the conventional blade root end for transferring loads to the turbine. To achieve the best rotor weight reduction, balanced loads in the primary rotor structure must flow uninterrupted across the rotor center, while net loads and moment imbalances must be taken out to the turbine main shaft.

It is conceptually attractive to simply bolt the turbine main shaft to the nacelle facing side of the wind turbine rotor hub, that is closest to the main shaft and provides the shortest load paths. The difficulty with this approach is that in carrying its flatwise and edgewise bending loads, the rotor structure has large strains (spanwise elastic deformations) at its surface. The metal turbine main shaft is highly rigid and can not follow these strains, and to bolt up directly would induce very large load flows through the fasteners, approaching those of a conventional blade root. This would require adding so much hub structure as to compromise the advantage of a one-piece rotor, as a large part of the balanced loads would then divert out of the rotor in crossing the hub center.

To avoid engaging high strain material on the outside of the rotor hub, a hub attachment can be designed to reach inside to lower strain regions on the main shear webs part way between their spar caps, where "main shear web(s)" denotes the shear web(s) to which the hub attachment is rigidly secured. The strains there form flatwise bending are modest, so it is an advantageous region for attachment, largely isolated from the large strains on the exterior of the rotor hub. This is how rotor hub attachment strain isolation is achieved—by avoiding connection to the external high strain rotor hub material, and instead reaching inside to low strain regions on the rotor hub shear web(s).

For a single shear web rotor design, both flatwise and edgewise bending induced strains are low near the shear web mid-height. However, as a tradeoff, rotor torque creates large out of plane loads perpendicular to the web that require the addition of considerable web reinforcement material, enough to negate some of the weight and cost advantages of the one-piece hub. Also, unbalanced rotor twist, as would be created when swept blades are loaded differentially, is not efficiently carried without additional structure.

For a double shear web rotor design, the offset of the webs from the edgewise neutral bending plane means that some fraction of the edgewise extreme fiber strain will exist at the preferred mid-height web mating locations. However, the chordwise separation of the two webs allows differential loading between the two mid-height web mating locations to efficiently react both rotor torque (a major design driver), and rotor twist. In addition, two shear webs are a better choice for buckling stabilization of the external rotor shell. While some strains are coupled into the attachment in the double web case, the strain energy and fatigue damage are low so that isolation is still effectively achieved, and overall this is a preferred embodiment for today's large rotor designs.

SUMMARY OF DISCLOSURE

The goal of this patent is to allow cost effective construction of structural one-piece wind turbine rotors. This is accomplished through the use of a novel attachment design that reaches inside the rotor hub, and secures to the web or webs from their mid-height. At the mid-height, the strains from flatwise bending are near zero, and strains from edgewise bending are a fraction of their extreme fiber values in the exterior hub region structure. The hub structure is the central part of the rotor structure, wherein load transfer to the attachment occurs.

This rotor attachment invention allows internal forces from balanced external wind and gravity loads to pass across the rotor center without having to move from the main structural spars, through the fasteners and a central steel hub of a conventional rotor. Only net loads from thrust and rotor weight, plus unbalanced aerodynamic and torque loads need pass into the strain isolating steel attachment, simplifying the load paths and the amount of structure required to carry them.

SUMMARY OF DRAWINGS

The accompanying drawings, which are incorporated in and constitute a part of the specification, illustrate preferred embodiments of the invention. These drawings, together with the general description of the disclosure given above and the detailed description of the preferred embodiments given below, serve to explain the principles of the disclosure.

FIGS. 4b, 4c, and 4d show variations of the ends of the mating structure.

DETAILED DESCRIPTION OF DISCLOSURE

It will be appreciated that not all embodiments of the invention can be disclosed within the scope of this document and that additional embodiments of the disclosure will become apparent to persons skilled in the technology after reading this disclosure. These additional embodiments are claimed within the scope of this disclosure.

Figure 1:
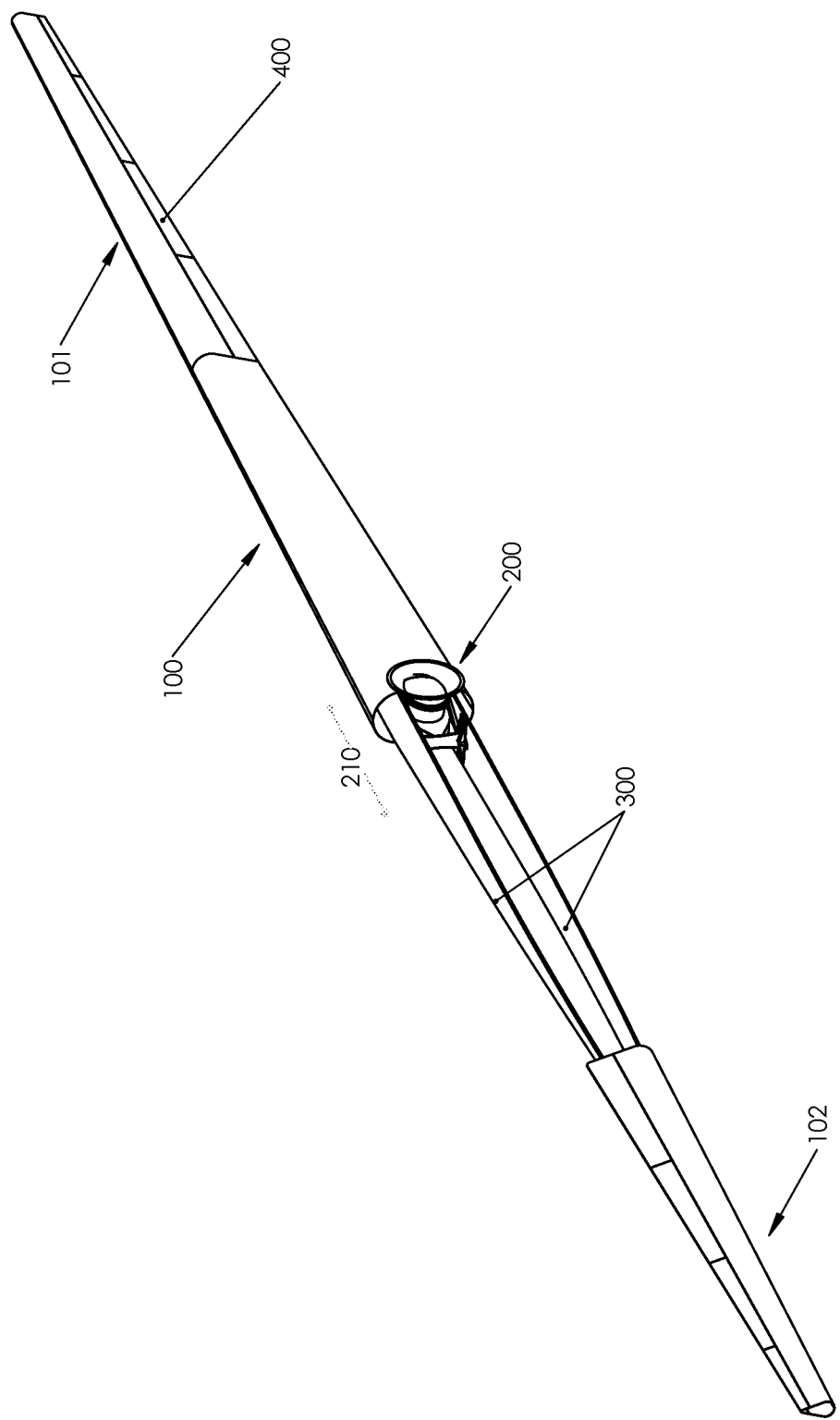
FIG. 1 illustrates a structural one-piece wind turbine rotor, with double internal spars and strain isolating hub attachment revealed, that uses outboard blade flaps for power control. Also shown is the unified two blade structure of the rotor.

In FIG. 1, a one-piece rotor 100, consisting of two blades 101, 102 built as one structure, is shown with double internal spars 300 revealed on blade 102, and outboard flaps 400 on both blades for control. The disclosure also includes single or multiple spar rotor hub structural configurations. Also shown is the strain isolating hub attachment 200 subject of this disclosure, and the one-piece wind turbine rotor hub 210, which is the inner rotor spanwise region that contains the strain isolating hub attachment 200, and in which loads transfer from rotor hub 210 to hub attachment 200.

To avoid engaging the high strain material on the outside of the rotor hub requires a hub attachment structure design to reach inside the hub to where lower strain regions exist on the main shear webs near halfway between their spar caps (midheight). The strains at shear web mid-height due to flatwise bending are near zero, so this is a fundamentally better region for attachment to be done, largely isolated from the large strains on the exterior of the rotor hub structure. This is how the strain isolating hub attachment works—by avoiding connection to external high strain rotor hub regions, and instead reaching inside to low strain regions of the rotor hub shear web(s).

It will be appreciated that a shear web is a rotor structural element constructed within the two surfaces of each blade, i.e., the outer aerodynamic shell of the blade. The shear web extends across between the inner surfaces of each shell, to join the two spar caps that carry the large structural loads that resist bending. The overall assembly of shear web and spar caps forms the main structural spar(s) that carry the blade wind loads.

It will be appreciated that the hub attachment is mechanically connected to the wind turbine main shaft. To the extent that the aerodynamic loath on one blade balance those on the other, no net moment need be carded out of the rotor into the wind turbine main shaft, only the net thrust in the downwind direction need be transferred. Stated differently the design of this disclosure allows balanced loads to be transferred straight across from blade to blade. Given that the rotor is mass balanced, the weight from one blade will balance that from the other, so again the moment from gravity need not flow out of the rotor, only the force due to its overall weight need do so. It will be appreciated that the load transfer of balanced as well as unbalanced loads is required in a conventional fully pitched three bladed wind turbine. A conventional blade root has joints that must carry the entire blade root load. As stated above, the disclosure contains a design that allows much of the load to flow straight across the central hub region from blade to blade. Accordingly, the number of joints and the loads carried across them are less. Joints add weight and cost, so not having to transfer the balanced loads out of the blades, across bearings, and into a separate central hub is an advantage.

Unbalanced loads from the rotor must be efficiently transferred to the wind turbine main shaft to hold the rotor in its desired rotational plane, and to transfer the torque that provides the turbine power output. Unbalanced flatwise loads arise from different wind speeds at each blade, such as blade up versus blade down, and from different angles of attack, such as when the rotor operates with yawed inflow. If swept blades are used, unbalanced torque about the hub spanwise axis is also created from these conditions. (It will be appreciated that "spanwise" and "spanwise axis" refers to the axis extending along the length of the single structure consisting of two blades.) Unbalanced edgewise loads are intentionally created by the aerodynamic forces extracting power from the wind; this is fundamental to how a wind turbine delivers its power.

Figure 2:
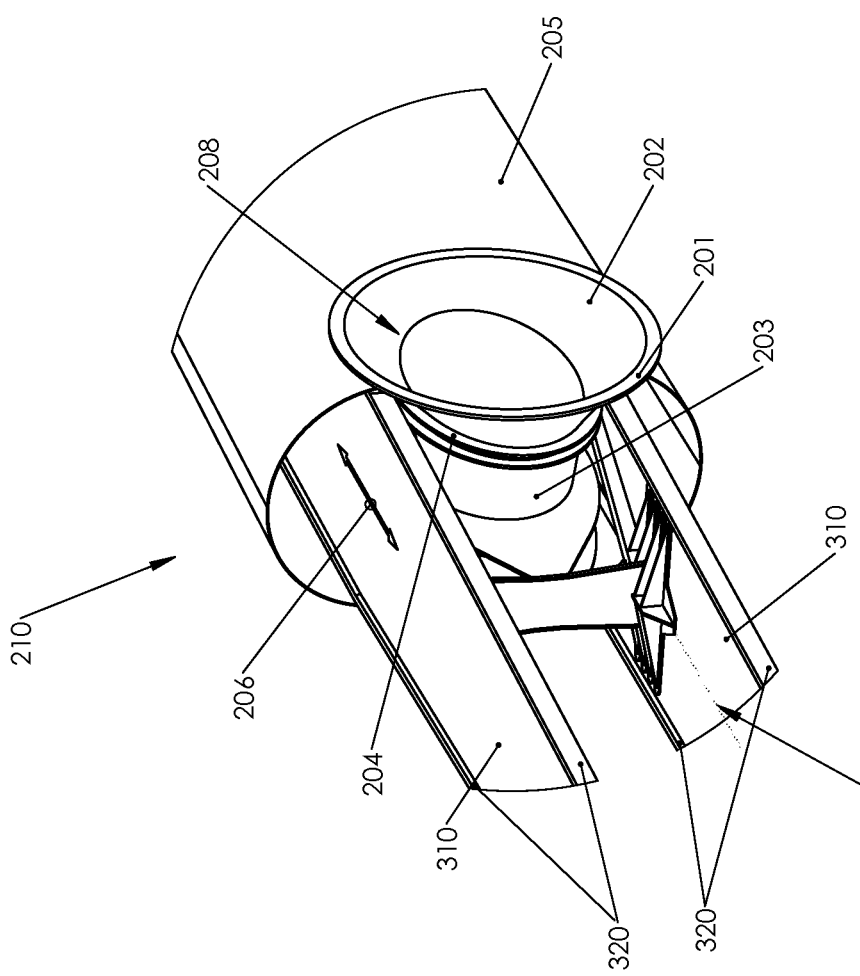
FIG. 2 illustrates a one-piece rotor hub, showing the attachment bolt circle that interfaces to the wind turbine main shaft, and a cutaway view of the internal attachment structure and its interface to double shear webs.

For attachment to the wind turbine rotating machinery within the nacelle, a circular, bolted, flat interface is normally used. FIG. 2 shows this interface 201 outside the hub structure. This is the bolt circle. In the process of wind turbine assembly, this interface would be bolted to a matching one on the wind turbine main shaft (not shown) when the rotor 100 (shown in FIG. 1) is lifted into position during turbine erection. Also shown is the external cone 202 and internal tubular shaft 203 that form an extension of the turbine main shaft to reach inside the rotor hub 210, so that attachment to the rotor shear webs can be accomplished. These components serve as the path for transfer of loads from the shear webs to the turbine main shaft. Also shown is a stiffening collar 204. This stiffener limits deformation at the transition 208 between the inner tube and external cone. The two shear webs 310 and four spar caps 320 that comprise the double spar primary structure are shown within the rotor, as are parts of the attachment structure that mate to them. The nacelle facing side 205 is also shown. The whole inner rotor region depicted, wherein load transfer from rotor to attachment structure occurs, is the one-piece wind turbine rotor hub structure 210 from FIG. 1. The web mid-height 207 is illustrated as the area of the shear web midway between the two spar caps 320. The rotor hub spanwise direction is indicated by the double arrow 206.

Figure 3A:
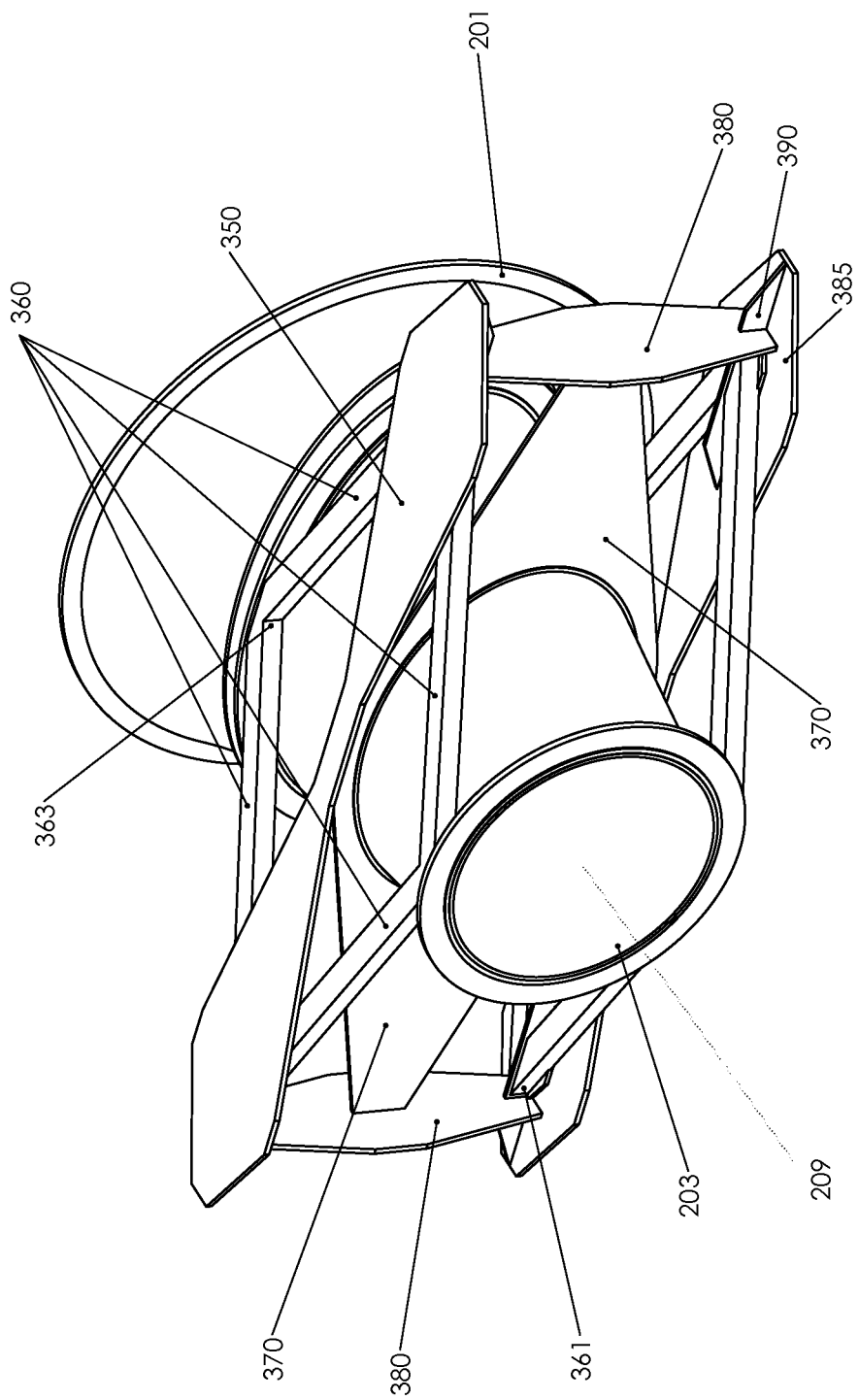
FIG. 3a illustrates a double shear web attachment structure without the shear webs shown, so its components can be better identified.

FIG. 3a shows a perspective view of the hub attachment for a double spar one-piece rotor without the hub structure present. The external bolt circle interface 201 is on a circular flange at one end of an external conical region that narrows down in the chordal dimension so it can pass between the double spar caps, its cross-section 208 (perpendicular to the tubular axis of rotation 209 around which the whole rotor rotates—see FIG. 2) thereby becoming ovalized where it passes into the rotor hub. It will be appreciated that a truss framework of similar envelope dimensions could be substituted for the tubular shell structure, and the attachment load flows would achieve the same function, so that a truss embodiment is deemed to be within the scope of this disclosure.

FIG. 3a also shows various parts of the hub attachment structure that provide the primary load paths to the internal tubular shaft from the shear web mating plates 350, which provide the attachment interface to the main shear webs. In this view, the mating plates 350 to the main shear webs 310 (see FIG. 2) are shown, along with the diamond shaped frames 360 that reach outward to an outboard junction 361 (two exist on each diamond frame) to support the mating plate ends 385 against in-plane loads. A planar yoke 370 attaching to the internal tubular shaft 203 near mid-penetration is also shown, as are the load transfer bridges 380 at its ends, which react the out of plane loads at the mating plate ends 385. A backbone 390 perpendicular to each mating plate end 385 and bridge 380 is also shown.

Shear web in plane loads along the hub spanwise axis (axial direction toward the blade tips) arise from gravity when the rotor is in the vertical orientation, and are carried via the diamond frames 360 to the internal tubular shaft 203, both to the side nearest the nacelle, and to the far side near the tip of the internal tubular shaft. By their design, these diamonds are relatively free to flex out of their own plane, so that they can follow the rotor flatwise bending as needed, without picking up much load or strain, an intended aspect of the invention.

The source of the largest shear web in plane loads along the hub spanwise axis arises from transmitting the power producing torque of the rotor into the tubular shaft extension. These loads form a large torque couple, going from right to left on one shear web, and left to right on the other. The center junctions 363 of the diamond frames carry that torque couple to the opposing sides of the internal tubular shaft 203, thereby transferring the power producing torque from rotor to shaft. The diamond frame edges 360 are placed along direct paths that efficiently transfer to these loads, as well as the thrust loads perpendicular to the torque loads. The diamond frame edges create stiff paths that assure that they carry the preponderance of these in plane loads.

Shear web in plane loads perpendicular to the hub spanwise axis arise primarily from rotor thrust, with a small additional component from gravity if the wind turbine shaft is tilted for additional rotor tip to tower clearance, as is often done. The diamond frames 360 provide the primary structural paths to take these thrust loads from the rotor to the internal tubular shaft 203.

Loads perpendicular to the shear web plane (out of plane loads) arise primarily from rotor weight when in the horizontal orientation, with a small additional component from rotor torque due to the finite stiffness of the diamond frames. The yoke structure 370 attached to the internal tubular shaft 203 near mid-penetration, and the bridges 380 at its ends, provide the paths for taking these loads from rotor hub to shaft.

The function of the yoke includes the ability to reach spanwise (along the long axis of the rotor hub) to the vicinity of the tips of the mating plate ends 385 and backbones 390, to stabilize them against motion perpendicular to the plane of the main shear webs. The function of the tip bridges 380 is to complete these load paths by reaching from the tips of the yoke to the tips of the web mating plates, utilizing the efficient load path along these bridges.

Figure 3B:
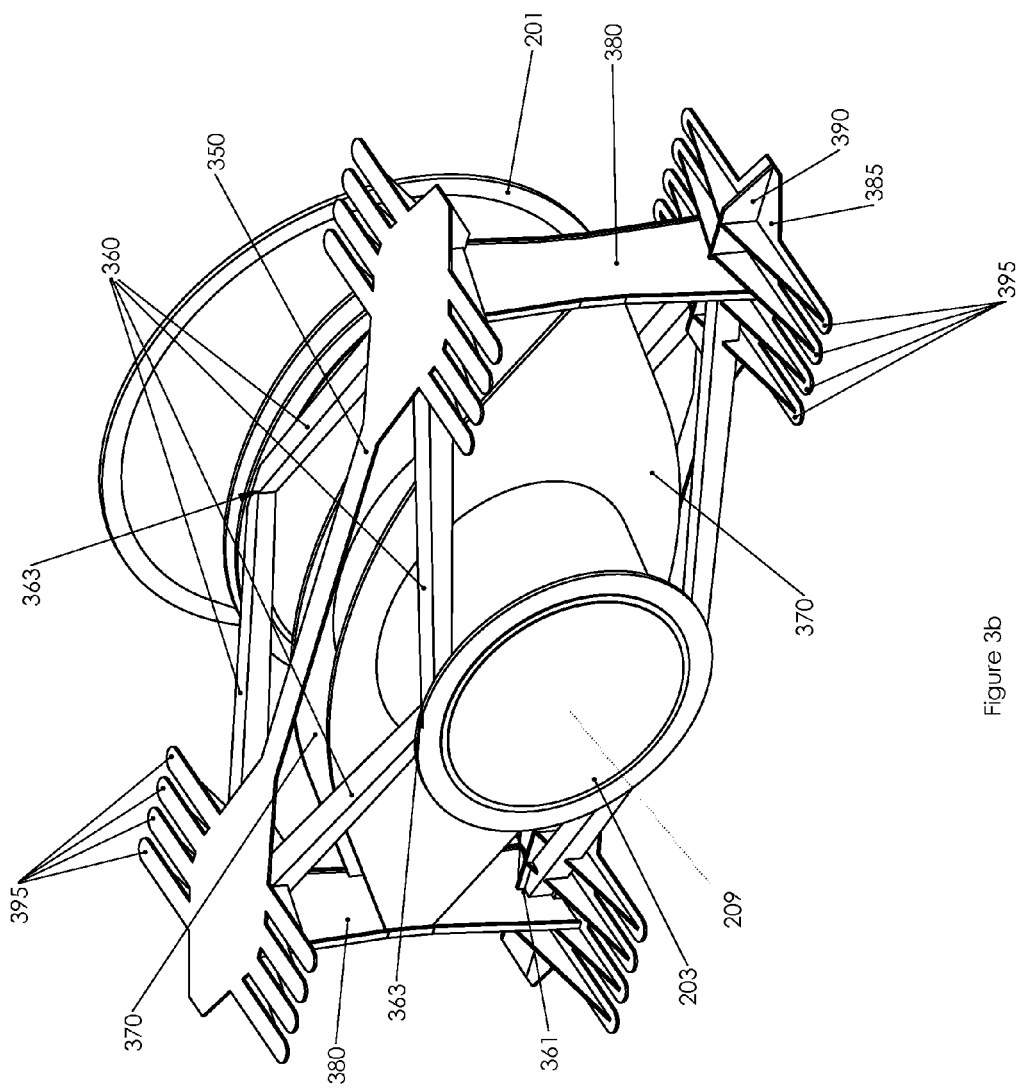
FIG. 3b shows a variation of the ends of the mating structure, and two yokes.

Added in FIG. 3b are lateral fingers 395 on the end plates 385 for providing additional attachment to the shear web along their length. The width of the end plates 385 is limited by strain deformations along the long axis of the rotor hub, which increase going outward from web mid-height toward the spar caps. Additional area for engagement to the shear web can be provided by thin fingers. By virtue of being narrow in the spanwise direction, these fingers can flex to follow the small spanwise extension and compression movements caused by rotor hub region bending, without inducing excessive loading into the fingers or their attachment to the web. This allows them to spread load further from the web mid-height, reducing the need for web reinforcing to limit bending across its width.

The presence, number, and length of these fingers is governed by cost tradeoffs between the additional hub attachment structure, and reinforcing of the shear web, which can be decreased when they are used. Since the double spar attachment carries rotor torque efficiently by virtue of oppositely directed loads into each web, out of plane web bending is limited, so it is possible that fingers would not be used as in FIG. 3a, so only a basic equal length, parallel finger embodiment is illustrated in FIG. 3b. Certain other finger embodiments are shown for the single spar attachment, where out of plane loads are larger, and their value is greater, but those alternative embodiments could be used for the double spar attachment as well. See FIGS. 4a through 4d. It is to be appreciated that bedding or bonding material between the mating plates (and fingers), and the shear web(s) may be used to provide load transfer in addition to that carried by mechanical fastening.

FIG. 3b also shows a second yoke 370. It is to be noted that the yokes do not transfer load to the web mating plates at their mid-points, so the rotor hub can flex edgewise independent of deformations of the attachment, thereby contributing to the structural isolation, and avoiding load transfers that would increase the weight of the rotor hub, attachment, and the fasteners that join them together. Decoupling these deformations is an intended feature of this disclosure.

Double spar attachment design variations with multiple yokes and multiple bridges are recognized as possible embodiments of the invention, and are included within the scope of this disclosure. Diamond frames with in-plane reinforcing and rounded corners are also included, as are additional diamond attachments to the shear web mating plates 350, at multiple spanwise locations.

As noted previously, the double spar/shear web rotor design is seen as the likely preferred choice for the large rotors that dominate today, but there are many design tradeoffs that may favor a single spar/shear web design in certain circumstances. The disclosed mid-height web attachment invention can be configured to work advantageously with the single spar rotor design as well, and is claimed within the scope of this patent.

Figure 4A:
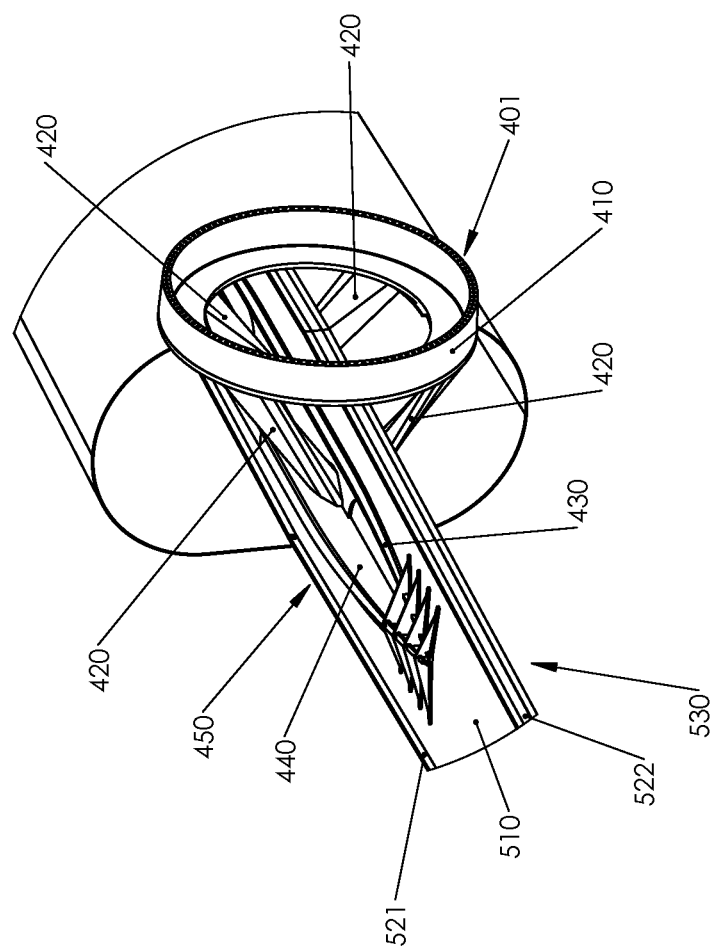
FIG. 4a illustrates a single shear web attachment structure, with a cutaway view of the internal structure and its interface to a single shear web.

FIG. 4a shows a preferred embodiment of the single spar attachment, with the bolt circle 401, external cylinder or cone 410, load transfer struts 420, web mating plate 430, and backbone 440. The external cylinder 410 function is to provide the bolt circle 401 that matches the end of the wind turbine main shaft, and it further provides a stiff member to spread loads from the load transfer struts 420 into the bolt circle. This part may also be conical to meet the dimensional transition needs of a particular wind turbine to rotor design mating geometry. Together the web mating plate and backbone forms the web mating structure 450, and while only one is visible in this view, there is a mirror image structure on the far side of the shear web. They are bolted together through the web so that they work as a single unit twice the height of the visible web mating structure. The main shear web 510 plus spar caps 521 and 522 that comprise the wind turbine rotor hub single spar 530 are also shown. The load transfer struts reach around and past the nacelle side spar cap 522 of the main spar. The wind turbine nacelle would be to the right in this view.

In this embodiment, the four primary struts 420 carry the loads from the web mating structure 450 to the bolt up cylinder 410. Other numbers of struts are possible, and this choice would be dictated by the needs of a specific design. Alternative strut numbers are recognized within the scope of this disclosure.

To carry gravity loads when the rotor is vertical, all the struts work together as short cantilevers, resisting the gravity force along the long axis of the shear web. When the rotor is horizontal, gravity loads are out of plane relative to the shear web, and the triangulation of the slanted struts, coming from each side of the web, provides an efficient path to take those loads to the standoff cylinder 410.

Rotor torque appears as an out of plane load couple at the tips of the two strut triangles, upward at one, and downward at the other. The two strut triangles are each formed from two struts 420 and the external cylinder 410 forming the base. This results in tension and compression loads in the struts, which they carry efficiently, since these loads are aligned with their long dimensions.

In this embodiment, the web mating structure is comprised of two planar, elongated, football shaped parts, one 430 that lies in the plane of the shear web and attaches to it, and another 440 perpendicular to it. The function of both of these elongated parts is to spread the strut loads far enough spanwise that they engage a sufficient length of shear web to be distributed efficiently into the rotor hub structure. The first one 430 handles loads that are primarily in the plane of the shear web, while the second 440, in conjunction with its mirror image part on the opposite side of the web, handles loads that are primarily directed perpendicular to the plane of the rotor shear web.

Figure 4B:
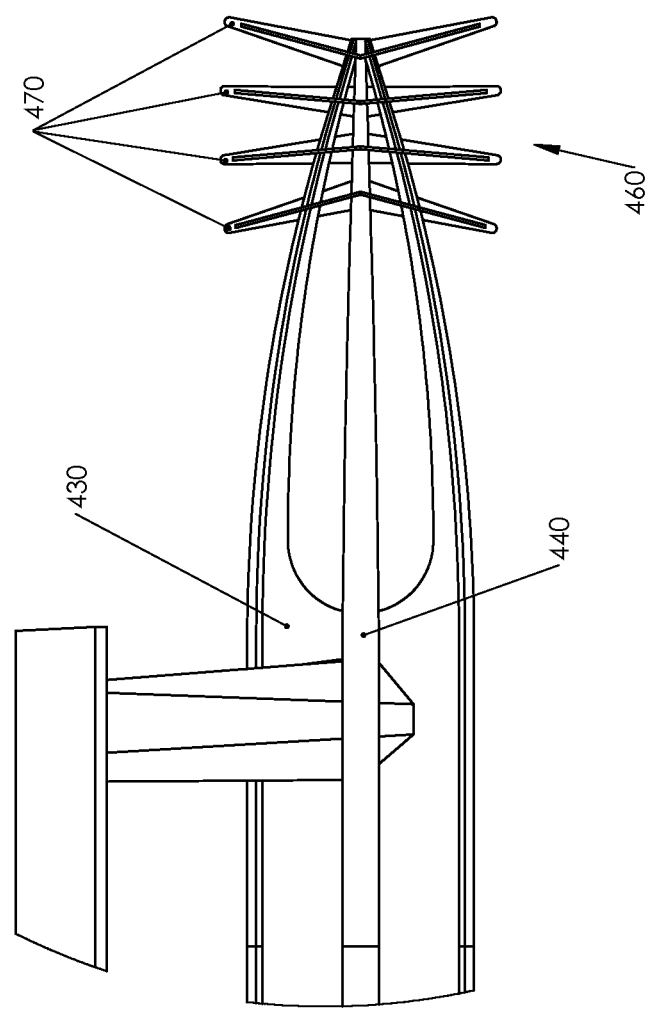

FIG. 4b shows a view of the web mating plate 430, backbone 440, end region 460, and lateral fingers 470, from perpendicular to the shear web. A larger number of fingers are shown compared to the double spar attachment, spread along a longer spanwise dimension, because the single spar attachment must transfer rotor torque via large out of plane loads from the shear web. Larger, stronger fingers are anticipated, with more of them engaging a larger area of shear web. They are shown splayed at angles to the rotor spanwise axis, to illustrated another way to engage a larger area of web and reach further outward from rotor center.

FIG. 4c shows the single spar attachment end region 460 with the lateral fingers 470. In this view, the lateral finger backbones 475 that carry out of plane loads toward the finger tips can be seen. Also shown are the web mating plate 430 and backbone 440.

Figure 4D:
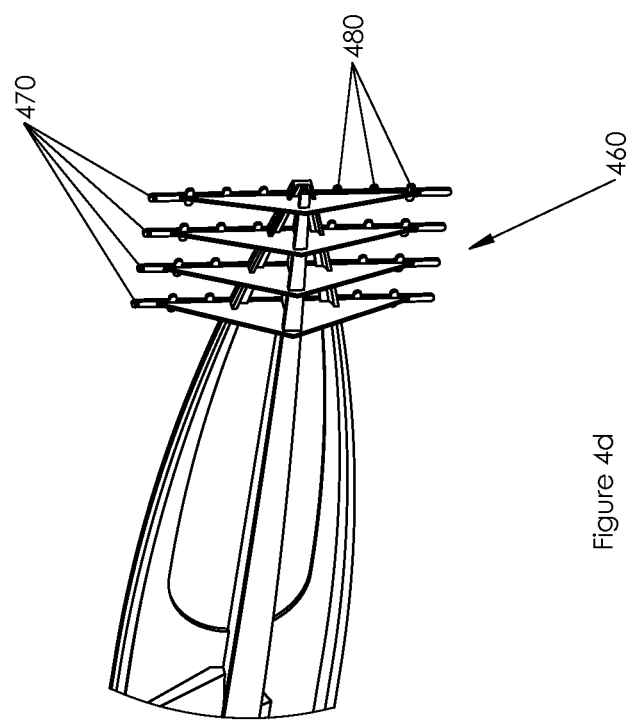

FIG. 4d shows the single spar attachment end region 460 with finger bolting tabs 480 to provide the means for fastening to the shear web, while increasing the flex of the lateral fingers 470 in the rotor hub spanwise direction.

Many other variations of the geometry of the fingers are possible, and are claimed within the scope of this disclosure.

A combination of the structural elements of the single spar attachment and double spar attachment disclosed herein may be used for a rotor hub with three or more main spars. These are not considered to be preferred embodiments due to their increased complexity and part count, and are not detailed herein, but are within the intended scope of this disclosure.

Feasibility

The load paths for both the double web and single web attachment designs are short and efficient, allow attachment to low strain regions of the rotor webs, with finger extensions to higher strain regions if/as needed, and minimize taking balanced moments out of the blades, as normal blade root designs must do. Balanced loads can flow across the hub region without passing through the attachment or its fastenings to the rotor. Only unbalanced loads (such as more wind on one blade than the other and rotor torque) and net loads (such as gravity and rotor thrust) that must pass from rotor to turbine are carried through the attachment, thereby allowing it to be much lighter than a conventional blade root and hub arrangement.

The geometry and structural volume available for the subject rotor attachment invention are sufficient to allow it to be fabricated from the same classes of materials that are presently used in wind turbine hubs; no special or unusually strong materials are needed.

While the parts required for the double spar design could be passed into the rotor interior through the ovalized hole for the tubular shaft, and a suitable hole could be created in the single spar rotor hub, it is anticipated that the metal parts would be fixed in place during the rotor fabrication, when easy access for both the work and quality control inspections would be provided. Once installed, these parts would be expected to serve the entire life of the turbine, so while it is feasible to design a method for removal, it is not anticipated that this would be needed. Individual fasteners could of course be inspected for integrity and preload, as is done with standard blade roots.

By providing entry to the rotor in its horizontal orientation, either through the tubular shaft extension or a suitable hatch in the rotor hub shell, the interior attachment hardware could be inspected from the safety and weather shielding of full enclosure. Likewise, actuators, sensors, or other hardware located in the hub interior could be accessed, examined, and serviced as needed. Access further out the blades could be provided from the interior, and even the possibility to exit the blade at the boundary of an outboard flap system, or partial span pitch, if such were used for rotor control.

Estimates of the combined weight of structural one piece rotor, using the advantageous attachment design disclosed herein, are about half the weight of a conventional three bladed full span pitch rotor of equivalent power rating and diameter. A primary design driver, especially for the taller towers being pursued recently, is to get the tower frequency high enough to avoid undesirable resonant behavior. A large reduction in tower top rotor mass would thereby save substantial weight and cost in the tower and (particularly offshore) foundation. It does not appear feasible to save as much weight with any design that must carry balanced as well as unbalanced blade root loads through a hub and bearings.

The disclosed attachment for a structural one-piece two bladed rotor hub shows superior structural efficiency to known alternatives in the art, due to its fundamental separation of loads that must be transferred out to the turbine, from those that may beneficially remain within the rotor structure. This reduces the weight and cost compared to conventional alternatives. It is to be noted that use of this attachment with a rotor that is controlled by flaps is not essential to the invention—a one-piece hub and the disclosed attachment could be used with partial span pitch control, outboard blade flow control using methods other than flaps, and the principles of the invention and its advantages would still accrue.

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size, and arrangement of components without departing from the scope of this disclosure. For example, equivalent elements may be substituted for those illustrated and described herein and certain features of the disclosure may be utilized independently of the use of other features, all as would be apparent to one skilled in the art after having the benefit of this description of the disclosure.

While specific embodiments have been illustrated and described, numerous modifications are possible without departing from the spirit of the disclosure, and the scope of protection is only limited by the scope of the accompanying claims.

The invention claimed is:

1. A wind turbine rotor attachment that provides a rigid connection from a wind turbine main shaft inside to at least one internal main shear web of a one-piece wind turbine rotor, and wherein the attachment is configured to be secured only to the central region of at least one of said one-piece wind turbine rotor internal shear webs.

2. The wind turbine rotor attachment of claim 1 wherein the wind turbine rotor attachment comprises a tubular shaft that rotates with the wind turbine main shaft and the tubular shaft extends a) into the one piece wind turbine rotor between two spar caps on a nacelle facing side of the one-piece wind turbine rotor, and b) across an interior of the one piece wind turbine rotor.

3. The tubular shaft of claim 2 wherein the tubular shaft has a circular, oval, or rectangular cross-section where it passes into the rotor, and tapers in at least one cross-section dimension as it extends from the wind turbine main shaft and across the one-piece wind turbine rotor.

4. The wind turbine rotor attachment of claim 2 comprising shear web mating plates secured to each main shear web and the shear web mating plates extend in a spanwise direction of the one-piece wind turbine rotor in a region centered at the main shear webs mid-height.

5. The wind turbine rotor attachment of claim 2 further comprising a pair of substantially diamond shaped frames positioned inside the one piece wind turbine rotor, wherein one diamond shaped frame is proximate and substantially parallel to each rotor main shear web, and each diamond shaped frame having an outboard junction proximate to each end of a shear web mating plate, and having a center junction connected to the tubular shaft, and wherein a first center junction of each diamond shaped frame attaches near a nacelle side of the tubular shaft, and a second center junction attaches near a tip end of the tubular shaft.

6. The wind turbine rotor attachment of claim 2 comprising
a) one or more yokes attached to the tubular shaft between a wind turbine rotor main shear webs, and said yokes are positioned perpendicular to said main shear webs and a tubular shaft axis of rotation, and at least one yoke extends outward in a spanwise direction of the wind turbine rotor;
b) one or more bridges at each end of at least one yoke wherein the bridges reach to shear web mating plates near each end of said plates;
c) a backbone perpendicular to a plane of each shear web mating plate, and the backbone extending in a spanwise direction along said mating plates; and
d) one or more lateral fingers on an outboard region of the mating plates, that are oriented across the main shear webs, toward the spar caps, and are secured to said main shear webs.

7. The wind turbine rotor hub attachment of claim 1 wherein an external cylinder or cone rotates with the wind turbine main shaft, and the external cylinder or cone is connected to load transfer struts that penetrate a rotor hub shell to reach inward past a nacelle side spar cap to the main shear web of a single spar one-piece wind turbine rotor hub.

8. The wind turbine rotor hub attachment of claim 7 wherein load transfer struts are secured to an elongated web interface structure that secures to the main shear web near a main shear web mid height, wherein said structure is comprised of mating plates on both sides of said main shear web, and elongated backbones perpendicular to a plane of said main shear web and mating plates.

9. The elongated web interface structure of claim 8, wherein one or more lateral fingers are attached on the outboard region of the web interface structure and the lateral fingers are oriented across the main shear web, toward the spar caps, and attach secure to said web.

10. A method for rigidly securing a one-piece wind turbine rotor to a wind turbine main shaft comprising
a) rigidly extending a wind turbine rotor attachment inside a one-piece wind turbine rotor; and
b) securing the wind turbine rotor attachment to at least one main shear web of the one-piece wind turbine rotor.

11. The method of claim 10 further comprising rotating a tubular shaft of the wind turbine rotor attachment with the wind turbine main shaft; extending the tubular shaft into the one-piece wind turbine rotor between two spar caps on a nacelle facing side of the one piece wind turbine rotor; and extending the tubular shaft across a distance of an interior of the one-piece wind turbine rotor.

12. The method of claim 11 further comprising transferring a load through two wind turbine main shear webs into a wind turbine rotor attachment; utilizing shear web mating plates secured to each main shear web; and extending the shear web mating plates at the main shear web mid-height in a spanwise direction of the one-piece wind turbine rotor.

13. The method of claim 12 further comprising:
a) positioning a pair of diamond shaped frames inside the one-piece wind turbine rotor, each frame proximate and substantially parallel to each main shear web;
b) attaching one or more yokes, with one or more bridges attached to the outboard ends of said yokes, to the tubular shaft between the main shear webs;
c) attaching both the diamond shaped structures and the bridges to the elongated shear web mating plates near the tip ends of the shear web mating plates; and
d) the elongated shear web mating plates, wherein on the outboard regions of said elongated shear web mating plates, one or more lateral fingers are attached and are oriented across the main shear webs toward the spar caps, and the lateral fingers secure to said main shear webs.

14. The method of claim 10 further comprising an external cylinder or cone that rotates with the wind turbine main shaft, and the external cylinder or cone is connected to struts that extend through a rotor hub shell to reach inward past a nacelle side spar cap to a main shear web of a single spar one-piece wind turbine rotor hub, and said struts attach to an elongated web interface structure near the mid-height of said web.

15. The method of claim 14, wherein the elongated web interface structure near the mid-height of the shear web has one or more lateral fingers near the ends of the elongated web interface structure, that extend across the shear web toward the spar caps, and are secured to said shear web.

* * * * *